May 16, 1967 G. E. STAFFORD 3,319,975
PALLETIZED TRUCK BODY WITH CENTER SPINE
Filed June 28, 1965 3 Sheets-Sheet 1

INVENTOR.
GEORGE E. STAFFORD
BY Knox & Knox

May 16, 1967    G. E. STAFFORD    3,319,975
PALLETIZED TRUCK BODY WITH CENTER SPINE
Filed June 28, 1965    3 Sheets-Sheet 2

*INVENTOR.*
GEORGE E. STAFFORD
BY Knox & Knox

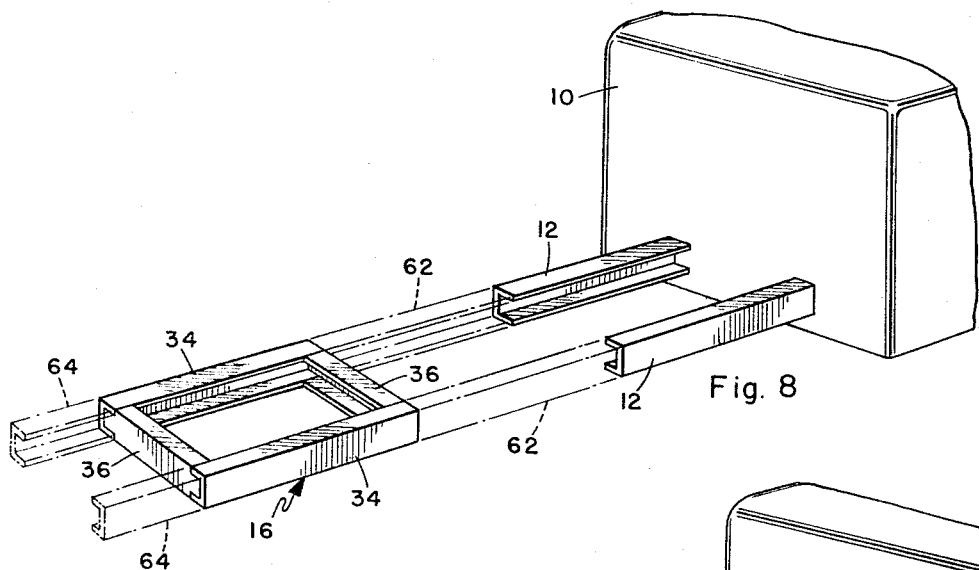
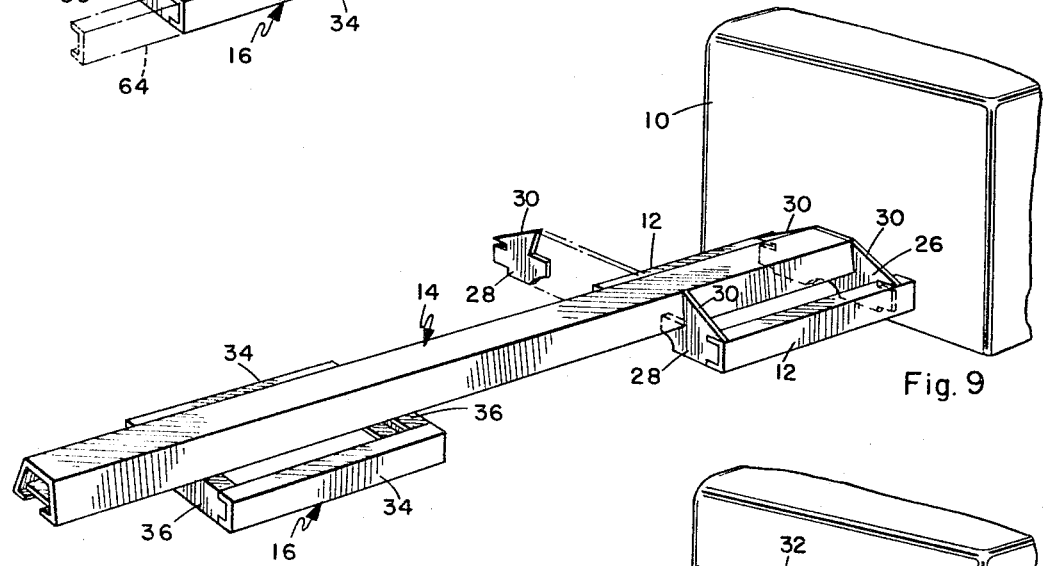
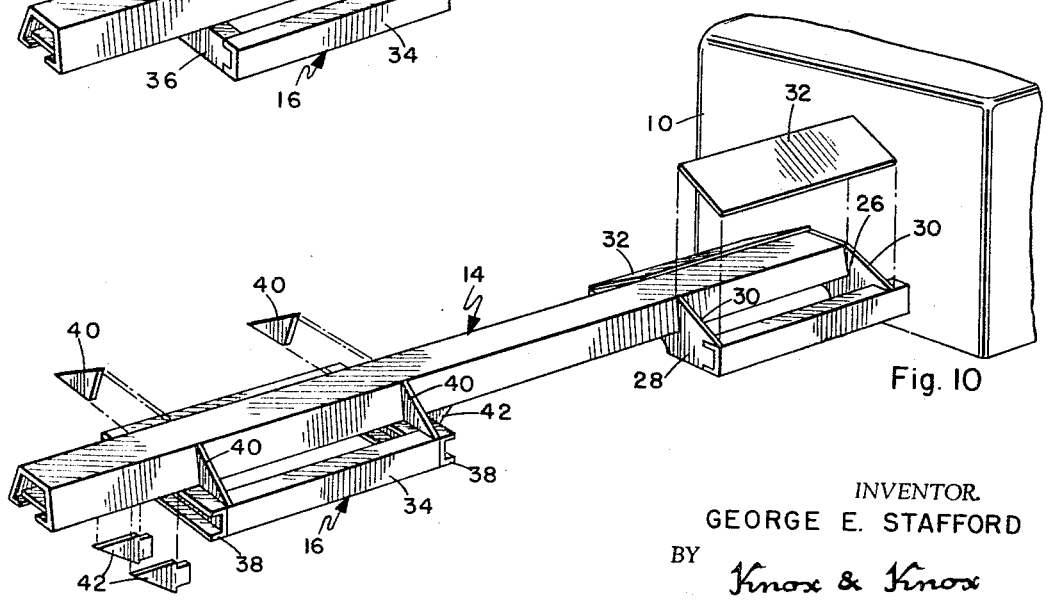

United States Patent Office 3,319,975
Patented May 16, 1967

3,319,975
PALLETIZED TRUCK BODY WITH CENTER SPINE
George E. Stafford, San Diego, Calif., assignor of fifty percent to Clyde H. Carlson, San Diego, Calif.
Filed June 28, 1965, Ser. No. 467,475
2 Claims. (Cl. 280—106)

The present invention relates to vehicles and more specifically to a palletized truck body with a center spine and the method of making the structure.

In trucks designed for carrying palletized loads, such as cases of bottled beverages, uniformly packaged goods and the like, the body usually has open sides to facilitate loading and unloading, the sides extending as low as possible for maximum load space. The conventional truck frame severely limits the load space by occupying a considerable portion of the body width in the lower sections. Some specialized trucks have been developed to provide increased load space, the most common type having a "pinch frame," in which portions of the frame rails have been cut out and moved inwardly to decrease the width. This is a compromise and does not entirely solve the problem. Other types have been constructed with somewhat narrowed central structures forming the rigid frame, but these inter alia require a vertically stepped portion over the rear wheels and may exhibit weak connections to the cab or vehicle power section.

The primary object of this invention, therefore, is to provide a truck body having a narrow central spine on which a body of maximum load capacity is mounted. The spine is unitized with the conventional frame structure of the cab unit and is a single beam. This single beam is uninterrupted and straight and extends entirely in one horizontal plane, without vertically stepped portions, at an elevated level, while still utilizing substantially conventional existing rear suspension means.

Another object of this invention is to provide a truck body which can be constructed on a conventional vehicle frame with a minimum of modification, the construction making it possible to adapt a short frame vehicle of low cost to a palletized truck of any reasonable length. More specifically it is an object of this invention to provide a single beam frame member which is elevated slightly above the usual height of frame members and in the disclosed embodiment is welded to webs which are in turn welded to the top of retained stubs of conventional frame members, and this construction is proposed as representing the optimum positioning of the frame member on the center line of the completed body.

A further object of this invention is to provide a truck body which is adaptable to a variety of load compartment arrangements, and in all such arrangements the body structure is integral with the spine and frame portions to form a very strong assembly with a minimum of structural parts.

The construction and method of assembly are illustrated in the drawings, in which:

FIGURE 8 is a perspective view showing the initial modification to a conventional vehicle frame;

FIGURE 9 is a perspective view showing the attachment of the spine to the vehicle cab section and;

FIGURE 10 is a perspective view showing the completion of the spine and frame assembly.

Similar characters of reference indicate similar or identical elements and portions throughout the specification and throughout the views of the drawing.

Figure 1:
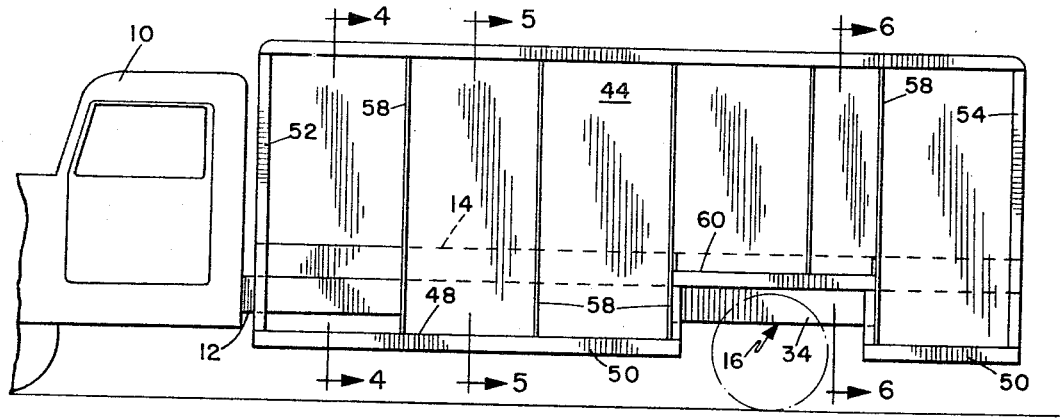
FIGURE 1 is a side elevation view of the truck.
Figure 2:
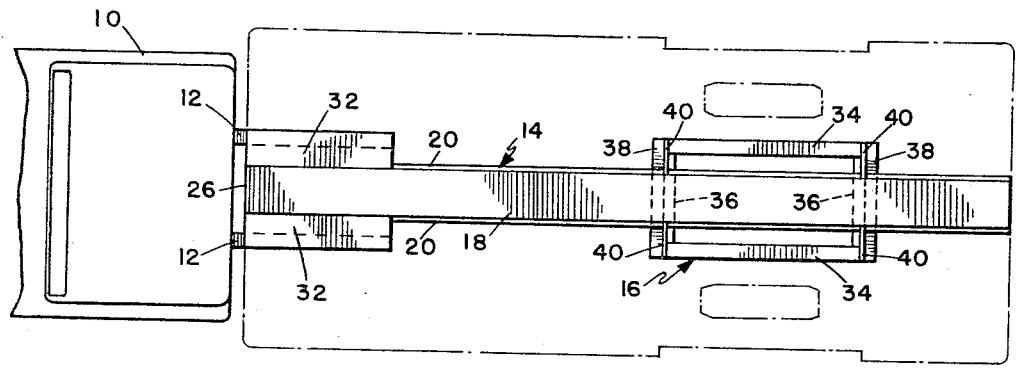
FIGURE 2 is a top plan view of the spine and frame, with the body indicated in broken line.
Figure 3:
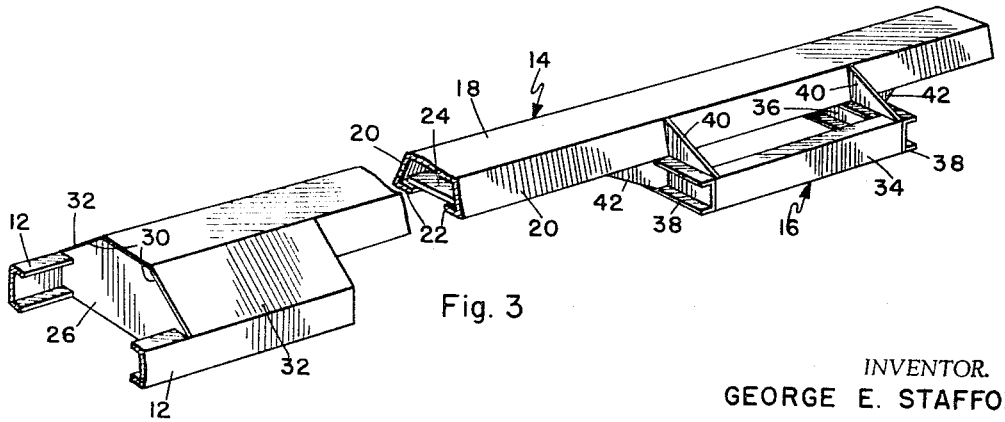
FIGURE 3 is a perspective view of the spin and frame assembly.
Figure 4:
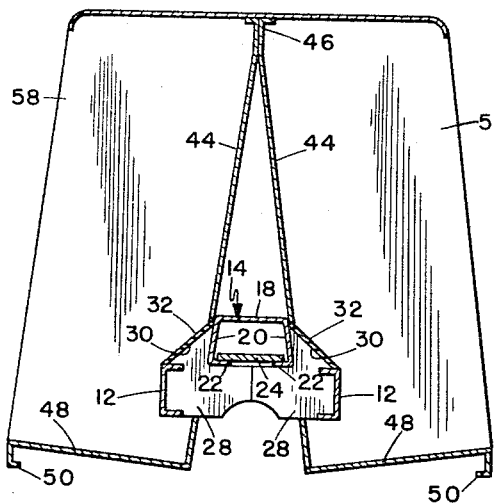
FIGURE 4 is an enlarged sectional view taken on line 4—4 of FIGURE 1.
Figure 5:
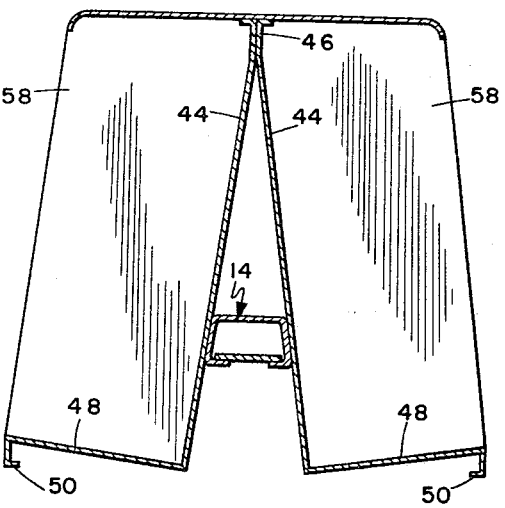
FIGURE 5 is an enlarged sectional view taken on line 5—5 of FIGURE 1.

The vehicle has a cab 10 carrying the front wheels, engine, controls and driver accommodation, the particular type not being critical. Extending from the rear of cab 10 are spaced frame rail stubs 12, which are extensions of the basic frame of the cab unit. Indirectly but unitarily fixed to the frame rail stubs 12 is a rigid spine 14 extending along the longitudinal center line of the body, elevated slightly above the usual height of frame elements, this optimum vertical positioning fortunately coinciding with such securement by welding of the forward end of the spine, indirectly as explained below to the top of the said frame rail stubs 12. Fixed to the spine adjacent the rear end thereof is a rear suspension frame 16. Spine 14 is a single box beam element having a top wall 18, side walls 20 extending downwardly and inclined outwardly, and inwardly turned lower flanges 22 which are interconnected by transverse tie plates 24 for rigidity. The tie plates may be spaced individual plates as shown, or could take the form of a single full length plate connecting the flanges. It should be noted that the spine 14 is not interrupted or weakened by any stepped portions but is, rather, continuous and straight. At the forward end a vertical web plate 26 is fixed between the rail stubs 12 immediately behind cab 10, said web plate extending above the rail stubs and the forward end of spine 14 being substantially level with the top of the rail stubs. Between the rear end of rail stubs 12 and spine 14 are web plates 28, together making a transverse plate similar to element 26, but made in two pieces and cut to fit the spine and rail structure. The upper edges of web plates 26 and 28 are inclined downwardly from the top of spine 14 to the rail stubs 12 in the manner of gussets, as indicated at 30, and the connection is reinforced by rectangular cap plates 32 secured at their ends to these inclined edges and along the sides to the spine and rail stubs. All of the structure is welded for simplicity and strength, the spine being held securely in alignment with the front frame of the vehicle.

Rear suspension frame 16 comprises a pair of side rails 34 joined by cross members 36, forming a rigid unit on which the rear axle assembly is mounted. No specific suspension structure is shown since any conventional type may be used. In existing vehicle frame sections the cross members may not be the straight channel elements as illustrated, so cross beams 38 are secured between the side rails 34 and along the cross members 36 to provide adequate attachment points for the spine 14. Gussets 40 are secured to the cross beams 38 and side walls 20 on opposite sides of spine 14 and further gussets 42 are attached longitudinally to the lower outer edges of the spine extending from said cross beams. Variations may be made in the reinforcement and bracing to suit the particular rear frame structure used.

Figure 6:
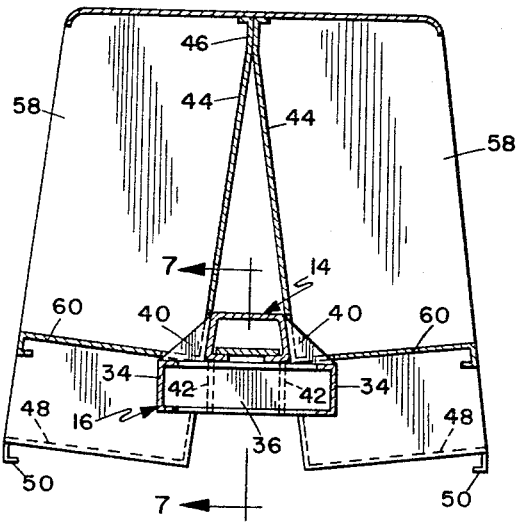
FIGURE 6 is an enlarged sectional view taken on line 6—6 of FIGURE 1.
Figure 7:
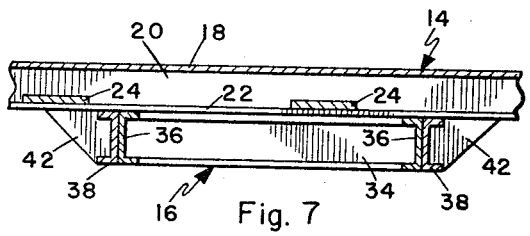
FIGURE 7 is a fragmentary sectional view taken on line 7—7 of FIGURE 6.

The load carrying body structure includes a pair of back panels 44 secured to opposite side walls 20 of the spine 14, the back panels being inclined toward each other above the spine and secured together at the longitudinal upper edges 46. Extending outwardly from the lower edges of back panels 44 are platforms 48, which are inclined slightly upwardly toward their outer edges and are substantially perpendicular to the back panels, the outer edges have longitudinal reinforcing flanges 50. The forward end of the body has a transverse, upright front wall 52 and the rear end has a similar rear wall 54, the top being covered by a roof 56 to form an open sided box structure. The side compartments so formed are divided into bays by divider panels 58, the spacing depending on the length of the vehicle and the size of pallets to be carried. As illustrated, one divider panel 58 is fitted at the rear end of rail stubs 12 and other panels at the front and rear ends of the rear frame 16. At the rear frame the suspension and wheels will limit the depth of the bay, a raised platform 60 being installed above each wheel location, as in FIGURE 6. Along the remainder of the vehicle length the bays can extend well below the spine, the depth being limited only by the need for reasonable ground clearance. Portions of the body structure may be unitary, or made from panels welded together, depending on the size and material used, the structure illustrated being somewhat diagrammatic and merely representative. The body structure and spine are joined in an integral unit with a large box-like cross section and high structural rigidity, so that loads are distributed throughout the assembly. The spine can thus be of reasonably small size since it is not required to carry the full stress on the vehicle in operation.

A noteworthy feature of the structure is that a conventional vehicle can be easily converted to this form at a minimum cost, the method of modifying the frame being illustrated in FIGURES 8–10. A standard vehicle frame is first modified by cutting out intermediate sections of the frame rails, indicated at 62, and removing the rear frame extensions 64 this leaves the forward rail stubs 12 and separates the rear suspension frame 16. A short frame vehicle can be used to minimize the amount of frame to be cut away, since the rear frame can be moved to any position to obtain the wheelbase required.

The web plate 26 is now installed between the forward portions of rail stubs 12 and the forward end of spine 14 welded to the web plate, then web plates 28 are added to hold the spine in alignment. Rear frame 16 can be tack welded under the spine at the required position. Cap plates 32 are then added at the forward end to complete the frame connection. Cross beams 38 and gussets 40 are secured to the rear frame 16 and spine 14, then gussets 42 are added to complete the spine and frame assembly.

The box structure of the body can be built up on the spine or preassembled in two side units and attached to the spine, the end panels and roof being added to complete the structure. The exact assembly of the body will depend on the particular breakdown of the various panels and the types of joints used.

With this structure the major portion of the vehicle has load space extending below the frame, with a large portion of the total width of the vehicle available, due to the narrow spine. The attachment to the vehicle cab unit is simple and rigid, no alterations being necessary to mechanism or complex portions of the basic vehicle. The rear suspension assembly and its existing frame are utilized and can be positioned where required to suit the particular vehicle. Various arrangements of body structure and compartments are possible to adapt to available loading and unloading apparatus.

It is understood that minor variation from the form of the invention disclosed herein may be made without departure from the spirit and scope of the invention, and that the specification and drawings are to be considered as merely illustrative rather than limiting.

I claim:
1. In a vehicle having a forward wheeled cab unit, a load carrying body assembly, comprising:
   a single straight elongated, narrow beam defining a spine rigidly fixed to and extending longitudinally rearwardly from said cab unit;
   a rear wheel suspension carrying frame unit fixed to said spine rearwardly of said cab unit;
   said spine extending uninterrupted and rectilinearly above said wheel suspension frame and being the sole spine element of the vehicle;
   compartmented, box-like load carrying body portions fixed to said spine on opposite sides thereof in back-to-back relation and secured to each other above the spine;
   said body portions extending below said spine along the major portion of the length thereof.
2. In a vehicle having a forward cab unit;
   frame rail stubs extending rearwardly from the cab unit in spaced relation;
   a single, straight elongated narrow beam defining a spine between and in longitudinal parallel relation with said frame rail stubs;
   connecting structure unitarily and rigidly securing said spine to said frame rail stubs;
   a rear wheel suspension frame unit fixed to said spine rearwardly of said cab unit;
   compartmented, box-like load carying body portions fixed to said spine on opposite sides thereof in back-to-back relation and secured to each other above the spine;
   said body portions extending below said spine along the major portion of the length thereof;
   said connecting structure including transverse web plates fixed between said frame rail stubs in longitudinally spaced relation, said spine being secured to the upper portions of said web plates, and cap plates on opposite sides of said spine secured peripherally to the spine, to said frame rail stubs and to said web plates.

References Cited by the Examiner

UNITED STATES PATENTS

| | | | |
|---|---|---|---|
| 2,596,478 | 5/1952 | Gerhardt | 296—28.2 |
| 2,839,328 | 6/1958 | Prickett | 296—28.2 |
| 3,028,191 | 4/1962 | Magor | 296—28.2 |

BENJAMIN HERSH, *Primary Examiner.*

P. GOODMAN, *Assistant Examiner.*